United States Patent
Cho et al.

(10) Patent No.: US 7,357,143 B2
(45) Date of Patent: Apr. 15, 2008

(54) REGULATOR AND GAS SUPPLY METHOD USING THE SAME

(75) Inventors: Bu-Hyoung Cho, Hwaseong-si (KR); Sung-Duk Yoon, Busan Metropolitan (KR); Sung-Min Hyun, Suwoni-si (KR); Young-Gi Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 272 days.

(21) Appl. No.: 11/313,285

(22) Filed: Dec. 20, 2005

(65) Prior Publication Data
US 2006/0169328 A1  Aug. 3, 2006

(30) Foreign Application Priority Data
Dec. 20, 2004  (KR) .................. 10-2004-0108792

(51) Int. Cl.
*G05D 16/02* (2006.01)
(52) U.S. Cl. .................. 137/14; 137/505; 137/505.42; 251/126
(58) Field of Classification Search .............. 137/12, 137/14, 505, 505.37, 505.39, 505.41, 505.42; 251/126
See application file for complete search history.

(56) References Cited

U.S. PATENT DOCUMENTS

| | | | | |
|---|---|---|---|---|
| 1,918,720 A | * | 7/1933 | Stettner | 137/505.42 |
| 2,598,187 A | * | 5/1952 | Meyer | 251/126 |
| 3,195,855 A | * | 7/1965 | Bauerlein | 251/120 |
| 4,936,342 A | * | 6/1990 | Kojima et al. | 137/510 |
| 5,950,652 A | | 9/1999 | Morgan | 137/14 |

FOREIGN PATENT DOCUMENTS

| JP | 2004-110179 | 4/2004 |
|---|---|---|
| KR | 1998-0009676 | 4/1998 |

* cited by examiner

*Primary Examiner*—Stephen M. Hepperle
(74) *Attorney, Agent, or Firm*—F. Chau & Associates, LLC

(57) ABSTRACT

A regulator comprises a body including an inflow line, an outflow line, and a buffer space, the buffer space being provided between the inflow line and the outflow line, and a switch for opening and closing a flow path of a fluid flowing from the inflow line to the buffer space. The switch comprises a seat member including an inlet for receiving the fluid from the inflow line, and an outlet for supplying the fluid received through the inlet to the buffer space, the seat member being disposed in the flow path and a movable cutoff member for opening and closing the inlet, the cutoff member being inserted into the seat member, wherein the outlet is configured for allowing the fluid to flow in one direction along an outer sidewall of the seat member.

22 Claims, 6 Drawing Sheets

REGULATOR AND GAS SUPPLY METHOD USING THE SAME

CROSS-REFERENCE TO RELATED APPLICATION

This application claims priority to Korean Patent Application No. 2004-108792, filed on Dec. 20, 2004, the disclosure of which is incorporated herein in its entirety by reference.

BACKGROUND OF THE INVENTION

1. Technical Field

The present disclosure relates to an apparatus for regulating a flow rate or pressure of a fluid and a method using the same, and more particularly, to an apparatus for regulating a flow rate or pressure of a process gas supplied into a semiconductor chamber and a method using the same.

2. Discussion of Related Art

In manufacturing semiconductor devices, etching and deposition processes are performed in a chamber that receives a wafer. A supply pipe is disposed at the chamber for supplying a process gas into the chamber. A pressure and a flow rate of the process gas supplied into the chamber must be precisely regulated to establish a consistent pressure and flow of the process gas in the chamber. A conventional supply pipe includes a pump for supplying a flow pressure to a gas and a regulator for supplying the gas into a process chamber at a regular pressure.

A typical regulator has a gas inflow line, a gas outflow line, and a body. A buffer space is provided for connecting the gas inflow line with the gas outflow line. A switch is disposed in the body for opening and closing a flow path of a gas flowing into the buffer space. The switch includes a seat member having an inlet and an outlet and a rod for opening and closing the inlet of the switch.

FIG. 1 illustrates a conventional regulator. A seat member 440 has a first outlet 442 and a second outlet 444. The first outlet 442 is disposed opposite the second outlet 444. At the respective outlets 442 and 444, a gas flow path indicated by the arrows is formed to be straight with a radial direction. Therefore, a gas flowing into a buffer space 448 through the outlets 442 and 444 is subjected to a primary head-on collision (location 'A') against an inner sidewall 452 of a body 450.

Subsequently, while the gas flows in two opposite directions and rotates along an outer sidewall of the seat member 440, a process gas exhausted through the first outlet 442 and a process gas exhausted through the second outlet 444 are subjected to a secondary collision (location 'B'). Since the process gas is subjected to the secondary collision within the buffer space 448, energy consumption of the gas increases and a flow rate thereof decreases substantially.

Further, since the gas does not flow smoothly in a buffer space, foreign substances or impurities contained in a process gas are not exhausted from the buffer space 448 and remain at the secondary collision location 'B'. Due to the presence of the foreign substances and impurities, a defective process occurs. In addition, since only two outlets 442, 444 are provided to a seat member 440, a gas flowing into the seat member 440 is not supplied to the buffer space 448 in a prompt manner.

SUMMARY OF THE INVENTION

According to an embodiment of the present invention, a regulator comprises a body including an inflow line, an outflow line, and a buffer space, the buffer space being provided between the inflow line and the outflow line, and a switch for opening and closing a flow path of a fluid flowing from the inflow line to the buffer space. The switch may comprise a seat member including an inlet for receiving the fluid from the inflow line, and an outlet for supplying the fluid received through the inlet to the buffer space, the seat member being disposed in the flow path and a movable cutoff member for opening and closing the inlet, the cutoff member being inserted into the seat member, wherein the outlet is configured for allowing the fluid to flow in one direction along an outer sidewall of the seat member.

According to another embodiment of the present invention, a regulator comprises a body including an inflow line, an outflow line, and a buffer space, the buffer space being provided between the inflow line and the outflow line, a seat member including an inlet for receiving a fluid flowing through the inflow line and an outlet for supplying the fluid received through the inlet to the buffer space, a cutoff member for opening and closing the inlet, the cutoff member being disposed in the seat member, a pressing member for pressing the cutoff member to open the inlet, the pressing member being disposed adjacent to the cutoff member, and an elastic member for moving the cutoff member to close the inlet when a force applied by the pressing member is removed, the elastic member being coupled to the cutoff member, wherein the outlet is configured for allowing the fluid to rotate in one direction within the buffer space.

According to another embodiment of the present invention, a gas supply method using a regulator comprises pressing a cutoff member disposed in a seat member to open an inlet of the seat member, flowing a gas through the inlet into the seat member, flowing the gas in one direction along an outer sidewall of the seat member into a buffer space through an outlet of the seat member, and supplying the gas to a process chamber through an outflow line connected to the buffer space.

BRIEF DESCRIPTION OF THE DRAWINGS

Preferred embodiments of the present invention can be understood in more detail from the following description taken in conjunction with the accompanying drawings in which.

DETAILED DESCRIPTION OF PREFERRED EMBODIMENTS

Exemplary embodiments of the present invention will now be described more fully hereinafter with reference to the accompanying drawings. The present invention may, however, be embodied in many different forms and should not be construed as limited to the embodiments set forth herein.

Figure 1:
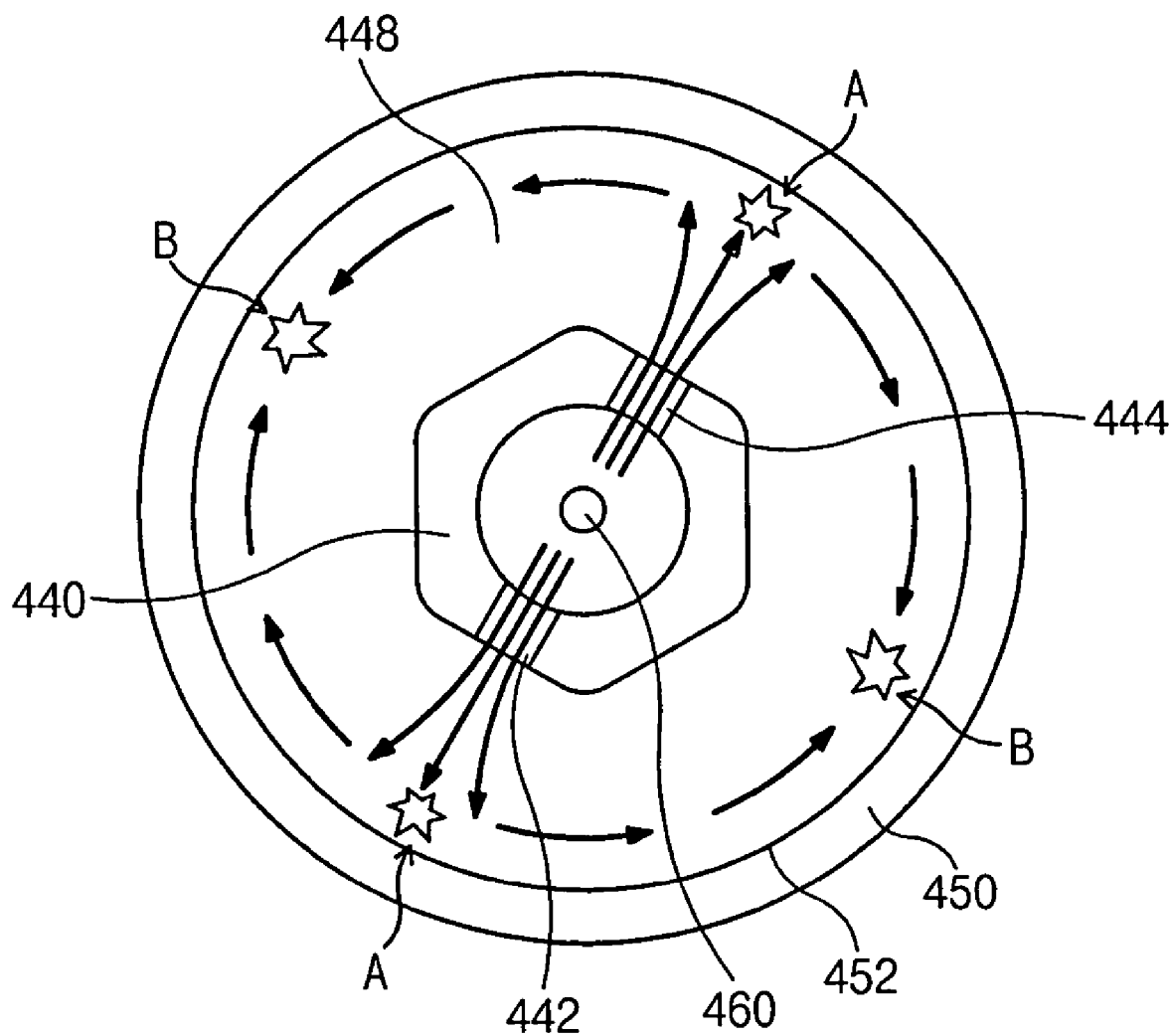
FIG. 1 illustrates a conventional seat member including two outlets.
Figure 2:
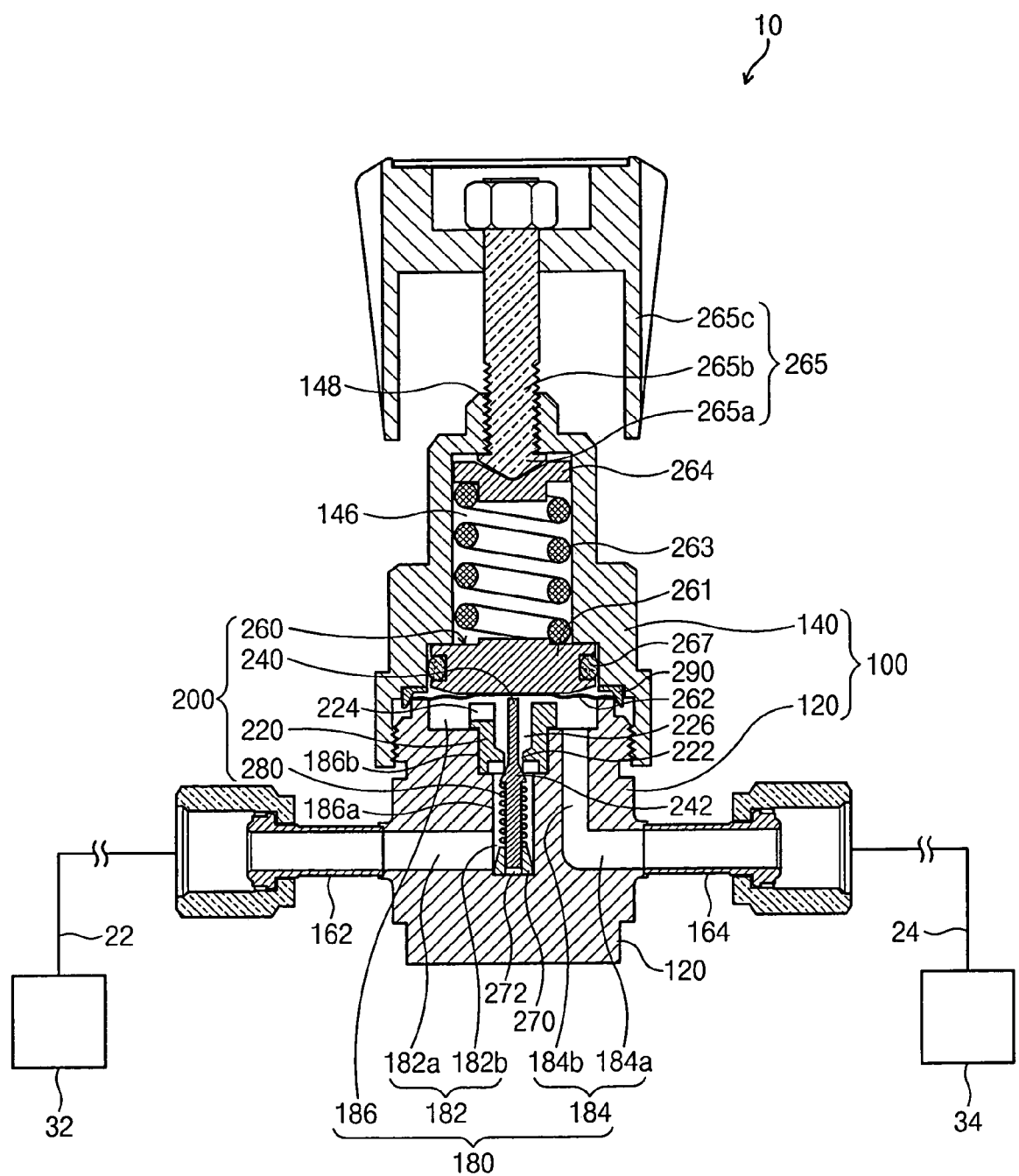
FIG. 2 is a cross-sectional view of a regulator according to an embodiment of the present invention.
Figure 3:
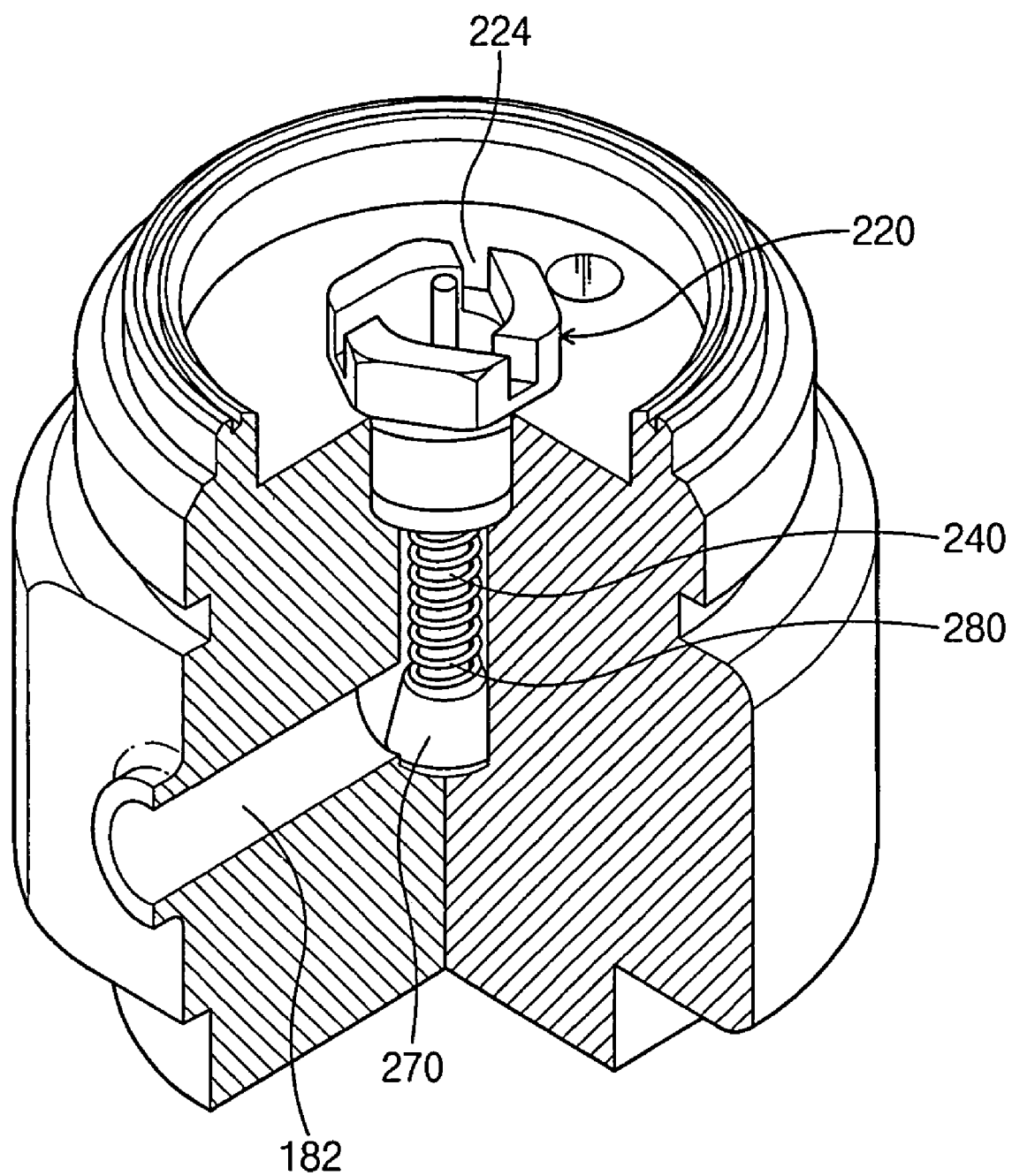
FIG. 3 is a perspective view of a partially cut body of a regulator according to an embodiment of the present invention.

FIG. 2 is a longitudinal sectional view of a regulator 10 according to an embodiment of the present invention, and FIG. 3 is a partially cut perspective view showing the inside of a body 120.

As illustrated in FIG. 2 and FIG. 3, the regulator 10 includes a housing 100 and a switch 200. The housing 100 includes the body 120 and a lid 140. Screw threads are formed at an upper end of the outer sidewall of the body 120 and a lower end of the inner sidewall of the lid 140, so that the body 120 and the lid 140 may be screw-coupled with each other. An input port 162 and an output port 164 are formed at two respective ends of the sidewall of the body 120 and protrude from the sidewall of the body 120. The input port 162 is connected to a supply pipe 22 for receiving a gas from the gas source 32. The output port 164 is connected to a supply pipe 24 for supplying a gas to a process chamber 34.

In the process chamber 34, a process is performed using a predetermined process gas. The process may be, for example, a deposition process or an etching process. In the body 120, a fluid flow line 180 is formed as a gas flow path from the input port 162 to the output port 164. According to an embodiment of the present invention, irrespective of pressure and flow rate of a fluid flowing in, the regulator 10 supplies the fluid to the process chamber 34 at a constant pressure.

The fluid flow line 180 includes an inflow line 182, an outflow line 184, and a buffer space 186. Recessed spaces are provided in a top of the body 120 and a bottom of the lid 140, respectively. By coupling the body 120 with the lid 140, the combination of the spaces forms the buffer space 186.

The inflow line 182 includes a horizontal section 182a horizontally extending toward the body 120 from the input port 162 to a perpendicular section 182b. The perpendicular section 182b extends perpendicularly from the horizontal section 182a to the buffer space 186, thereby connecting the horizontal section 182a to the buffer space 186. A transverse section of the buffer space 186 is circular.

The outflow line 184 includes a horizontal section 184a extending toward the body 120 from the output port 164 to a perpendicular section 184b. The perpendicular section 184b perpendicularly extends from the horizontal section 184a to the buffer space 186, thereby connecting the horizontal section 184a and the buffer space 186. The perpendicular section 182b of the inflow line 182 is connected to the bottom center of the buffer space 186, and the perpendicular section 184b of the outflow line 184 is connected to the bottom edge of the buffer space 186.

The perpendicular section 182b of the inflow line 182 includes a lower part 186a and an upper part 186b connected to the buffer space 186. According to an embodiment of the present invention, since the upper part 186b has a longer inner radius than the lower part 186a, a boundary portion between the upper part 186b and the lower part 186a is stepped.

The fluid flow line 180 in the body 120 is opened and closed by the switch 200. The switch 200 includes a seat member 220, a cutoff member 240, a pressing member 260, and an elastic member 280. The seat member 220 is disposed in the upper part 186b and has a substantially similar radius to the inner radius of the upper part 186b. A bottom of the seat member 220 is in contact with a bottom of the upper part 186b. The seat member 220 is taller than the upper part 186b to partially protrude toward the buffer space 186.

A through-hole 226 is provided at the center of the seat member 220. A gas flows up and down via the through-hole 226. A transverse section of the through-hole is circular. The bottom center of the seat member 220 functions as an inlet 222 through which a gas flows into the through-hole 226. A bent portion is formed at an upper end (i.e., a portion protruding toward the buffer space 186) of a sidewall of the seat member 220. The bent portion results in an outlet 224 through which the gas flowing into the through-hole 226 flows out to the buffer space 186.

Figure 5:
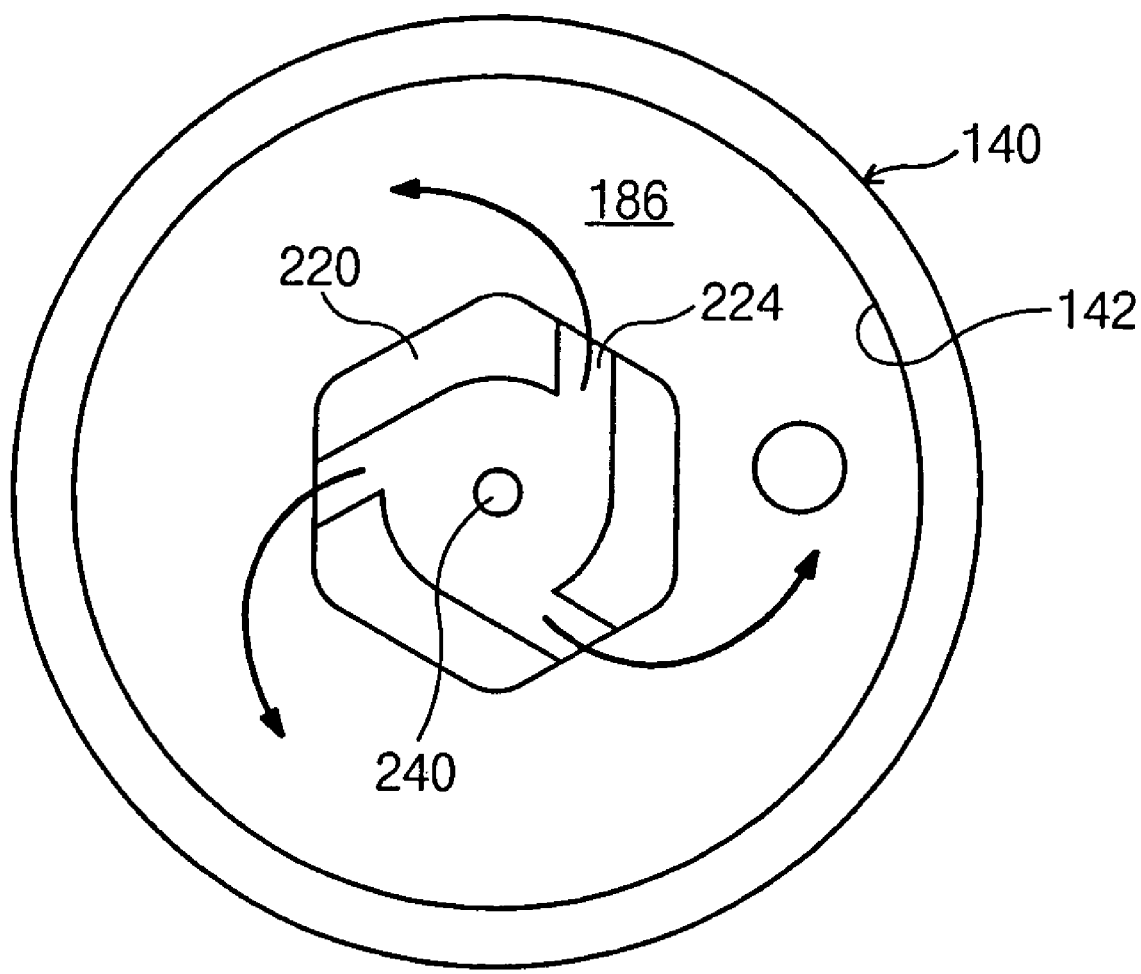
FIG. 5 is a top plan view of a body and a seat member according to an embodiment of the present invention.

Referring to FIG. 3, three outlets 224 are formed in the seat member 220. The outlets 224 in the seat member 220 are spaced apart at regular intervals. Referring to FIG. 5, each of the outlets 224 is configured, for example, along a chord line direction of the buffer space 186, such that the flow of gas from the outlets 224 is at one angle with respect to the radial direction of the buffer space 186. The amount of offset of each of the outlets 224 is identical such that gases flow in the same direction along an outer peripheral sidewall of the seat member 220 within the buffer space 186.

The cutoff member 240 is inserted into the through-hole 226 of the seat member 220 for opening and closing the inlet 222. The cutoff member 240 has an elongated cylindrical rod shape. A fixing protrusion 270 is positioned at the end portion of the horizontal section 182a of the inflow line 182. One end of the cutoff member 240 is inserted into a groove 272 formed at the fixing protrusion 270, and the other end thereof protrudes upwardly from the seat member 220.

The cutoff member 240 includes a protruding part 242 that laterally protrudes to open and close the inlet 222 of the seat member 220. The protruding part 242 includes a conic portion. A longitudinal section of the top end of the protruding part 242 is smaller than a size of the inlet 222 of the through-hole 226, and a transverse section of the bottom end of the protruding part 242 is larger than the size of the inlet 222 of the through-hole 226. The protruding part 242 is disposed below the seat member 220.

The elastic member 280 is coupled to the bottom of the protruding part 242. The elastic member 280 can be, for example, a spring. One end of the elastic member 280 is fixed to the bottom of the protruding part 242, and the other end thereof is fixed to the top of the fixing protrusion 270. The elastic member 280 is installed while being pressed at a determined pressure, so that when an external force is not applied, the protruding part 242 is partially inserted into the through-hole 226 to close the inlet 222 of the seat member 220. One end of the cutoff member 240 moves up and down within the groove 272 formed at the fixing protrusion 270.

The cutoff member 240 moves downwardly using the pressing member 260 to open the inlet 222 of the seat member 220. The pressing member 260 includes a pressing block 261, a diaphragm 262, a load spring 263, a cone washer 264, and an adjusting bar 265. The pressing block 261 is disposed at an upper portion in the buffer space 186 and has an outside diameter similar to a diameter of the buffer space 186.

Ring-shaped grooves are formed at sidewalls of the pressing block 261. O-rings 267 are inserted into the ring-shaped grooves to divide the pressing block 261 into an upper part and a lower part. The pressing block 261 is movable upwardly and downwardly within the buffer space 186. The diaphragm 262 is provided between the pressing bock 261 and the seat member 220. A ring-shaped fixture 290 is positioned on the edge of the diaphragm 262 to fix the diaphragm 262 within the buffer space 186. If the pressing block 261 moves downwardly, it presses the top end of the cutoff member 240 by making the diaphragm 262 an intermediary to open the inlet 222 of the seat member 220. When the pressing block 261 presses the top end of the cutoff member 240, the diaphragm 262 adheres closely to a top surface of the seat member 220.

The lid 140 includes an upper space 146. The upper space 146 extends upwardly from the buffer space 186 and has a smaller cross section than the buffer space 186. The cone washer 264 and the load spring 263 are disposed in the upper space 146. The cone washer 264 is disposed at an upper portion of the upper space 146, and the load spring 263 connects the cone washer 264 to the pressing member 260. According to an embodiment of the present invention, one end of the load spring 263 is fixed to the bottom of the cone washer 264, and the other end thereof is fixed to the top of the pressing member 260.

An adjusting groove 148 is formed in the lid 140. The adjusting groove 148 extends upwardly from the upper space 146 to penetrate the lid 140. Screw threads are formed at an inner sidewall of the adjusting groove 148. The adjusting bar 265 is inserted into the adjusting groove 148 and includes a pressing part 265a, a load part 265b, and a handle part 265c. The pressing part 265a is disposed in the upper space 146. An end of the pressing part 265a has a cone shape and contacts the cone washer 264 to press the same.

The load part 265b extends upwardly from the pressing part 265a into the adjusting groove 148. Screw threads are formed at an outer sidewall of the load part 265b, coupling the load part 265b with the adjusting groove 148. The handle part 265c is coupled with the top end of the load part 265b and enables a user to rotate the load part 265b. The load spring 263 prevents the adjusting bar 265 from moving freely. Due to rotation of the handle part 265c, the adjusting bar 265, the load spring 263, and the pressing member 260 move down.

Figure 4:
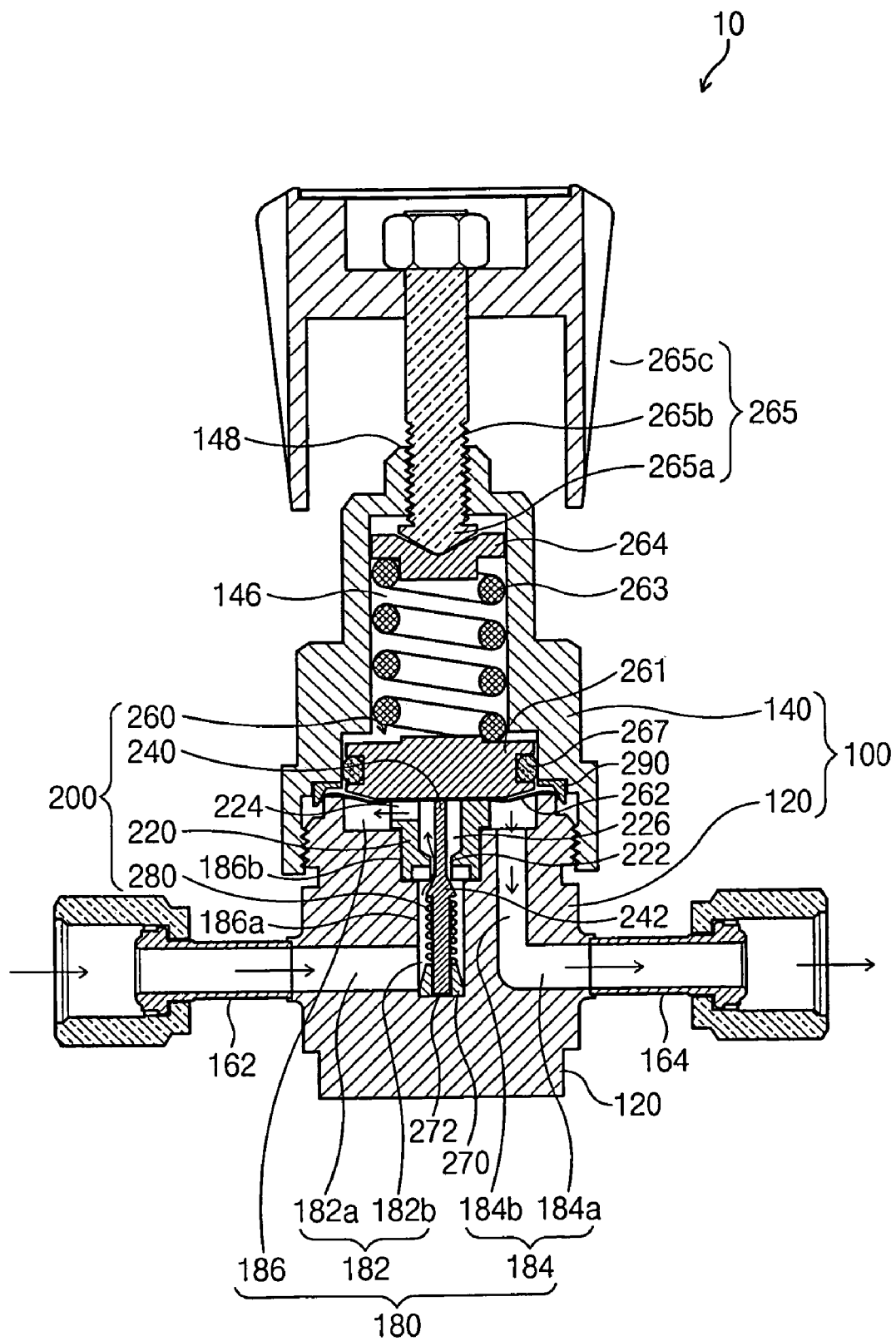
FIG. 4 is a cross-sectional view of a regulator including a seat member whose inlet is open according to an embodiment of the present invention.

FIG. 4 is a cross-sectional view of a seat member 220 whose inlet 222 is open according to an embodiment of the present invention. FIG. 5 is a top plan view of the body 120 and a seat member 220 according to an embodiment of the present invention. Arrows in FIG. 4 indicate a flow path of gas within the regulator 10. Arrows in FIG. 5 indicate a flow path of gas within a buffer space 186. Referring to FIG. 4, if the diaphragm 262 is pressed by the pressing member 260, the diaphragm 262 contacts a top end of the seat member 220 and the cutoff member 240 moves downwardly to open the inlet 222 of the seat member 220.

A gas supplied into the regulator 10 from the gas source 32 flows through the inflow line 182, the through-hole 226 in the seat member 220, the buffer space 186, and the outflow line 184 to be supplied to the process chamber 34 after a flow rate and a pressure of the gas are regulated. Referring to FIG. 5, when a gas is supplied to the buffer space 186 from the seat member 220, the gas does not flow in the radial direction of the buffer space 186. The gas flows at one angle with respect to the radial direction of the buffer space 186 through outlets 224 which are offset from a radius of the buffer space 186. In an embodiment of the present invention, the amount of offset of each of the outlets 224 is the same, such that gas flows out of each outlet 224 in the same angular relationship with respect to the radial direction of the buffer space 186. Thus, according to an embodiment of the present invention, the gas revolves along an outer sidewall of the seat member 220 within a buffer space 186 in one direction such as counter-clockwise as shown in FIG. 5.

Since the gas is supplied into the buffer space 186 at an angle with respect to the radial direction of the buffer space 186, a gas flowing from the outlet 222 is not subjected to a head-on collision against an inner sidewall 142 of the body 120. Thus, loss of energy in the gas is reduced. When a plurality of outlets 224 are provided according to embodiments of the present invention, the plurality of outlets 224 can be configured to flow the gases in the same direction. For example, the gases may flow clockwise or counter-clockwise at the same angle with respect to the radial direction of the buffer space 186. In accordance with embodiments of the present invention, gases exhausted to the buffer space 186 through different outlets 224 do not collide each other while flowing in the buffer space 186. As a result, energy loss caused by collision of gases and stagnation of foreign substances in the gases at the collision spots can be prevented. Since gases flow without collision within the regulator 10 according to embodiments of the present invention, the regulator 10 can respond to pressure fluctuation or flow change promptly and thus supply gases of pressure and flow rate suitable for process conditions to the process chamber 34 at a high speed.

Figure 6A:
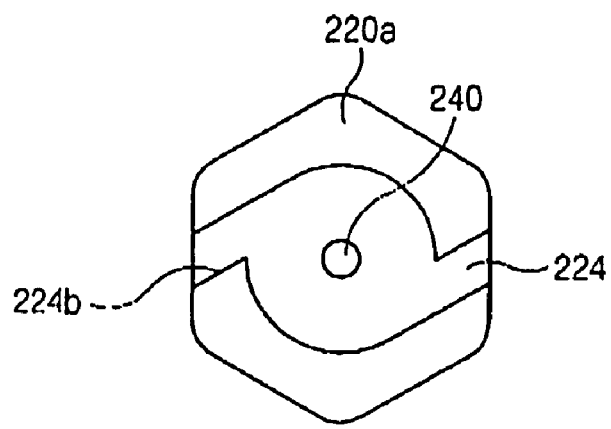
FIG. 6A, FIG. 6B and FIG. 7 are top plan views showing seat members according to embodiments of the present invention.
Figure 6B:
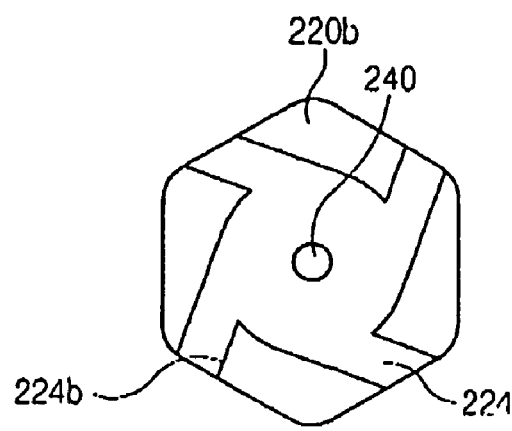
Figure 7:
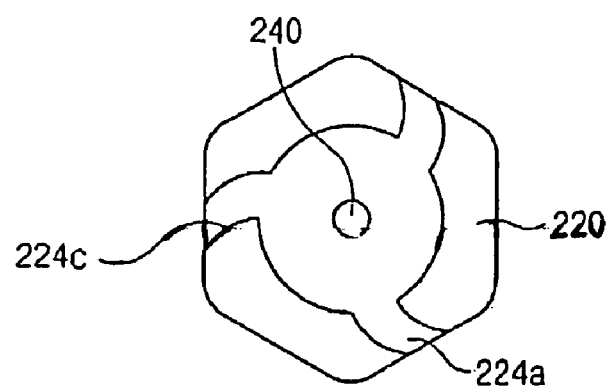

The number of outlets 224 formed at the seat member 220 may vary based on the desired amount of a gas to be supplied through the inflow line 182. For example, instead of 3 outlets, 1, 2 or 4 or more outlets may be provided. Referring to FIG. 6A, a seat member 220a includes two outlets 224 according to an embodiment of the present invention. Referring to FIG. 6B, a seat member 220b includes four outlets 224 according to another embodiment of the present invention. Referring to FIGS. 5, 6A and 6B, side walls 224b of an outlet 224 can be straight according to an embodiment of the present invention. Alternatively, as illustrated in FIG. 7, side walls 224c of an outlet 224a may be curved to reduce a shock caused by collision of gases against an inner sidewall of the body 120 in the buffer space 186. In this embodiment, the outlet 224a is provided by bending an upper end of a sidewall of the seat member 220. According to another embodiment of the present invention, the outlet 224 may be provided by forming a hole penetrating a sidewall at the upper end of the sidewall of the seat member 220.

According to another embodiment of the present invention, a liquid can be used as the fluid.

Although preferred embodiments have been described with reference to the accompanying drawings, it is to be understood that the present invention is not limited to these precise embodiments but various changes and modifications can be made by one skilled in the art without departing from the spirit and scope of the present invention. All such changes and modifications are intended to be included within the scope of the invention as defined by the appended claims.

What is claimed is:

1. A regulator comprising:
   a body including an inflow line, an outflow line, and a buffer space, the buffer space being provided between the inflow line and the outflow line; and
   a switch for opening and closing a flow path of a fluid flowing from the inflow line to the buffer space,
   wherein the switch comprises:
   a seat member including an inlet for receiving the fluid from the inflow line, and an outlet for supplying the fluid received through the inlet to the buffer space, the seat member being disposed in the flow path; and a movable cutoff member for opening and closing the inlet, the cutoff member being inserted into the seat member, wherein the outlet is configured for allowing the fluid to flow in one direction along an outer peripheral sidewall of the seat member.

2. The regulator of claim 1, wherein the outlet is offset from a radius of the buffer space.

3. The regulator of claim 2, wherein the flow of the fluid from the outlet is at one angle with respect to the radial direction of the buffer space.

4. The regulator of claim 1, wherein the outlet is configured along a chord line of the buffer space.

5. The regulator of claim 1, wherein the seat member includes a plurality of outlets configured for enabling the fluid to be exhausted through each of the plurality of outlets in the same direction.

6. The regulator of claim 5, wherein the plurality of outlets are spaced apart at regular intervals.

7. The regulator of claim 1, wherein the fluid is a gas.

8. The regulator of claim 1, wherein a sidewall of the outlet is straight.

9. The regulator of claim 1, wherein a sidewall of the outlet is curved.

10. The regulator of claim 1, wherein the inlet is formed at a bottom of the seat member, and the outlet is provided at the top end of a sidewall of the seat member.

11. The regulator of claim 1, wherein the inflow line is coupled to a pipe connected to a gas source, and the outflow line is coupled with a pipe connected to a semiconductor process chamber.

12. The regulator of claim 1, wherein the buffer space has a circular transverse section.

13. A regulator comprising:

a body including an inflow line, an outflow line, and a buffer space, the buffer space being provided between the inflow line and the outflow line;

a seat member including an inlet for receiving a fluid flowing through the inflow line and an outlet for supplying the fluid received through the inlet to the buffer space;

a cutoff member for opening and closing the inlet, the cutoff member being disposed in the seat member;

a pressing member for pressing the cutoff member to open the inlet, the pressing member being disposed adjacent to the cutoff member; and an elastic member for moving the cutoff member to close the inlet when a force applied by the pressing member is removed, the elastic member being coupled to the cutoff member, wherein the outlet is configured for allowing the fluid to rotate in one direction within the buffer space.

14. The regulator of claim 13, wherein the outlet is offset from a radius of the buffer space.

15. The regulator of claim 14, wherein the flow of the fluid from the outlet is at one angle with respect to the radial direction of the buffer space.

16. The regulator of claim 13, wherein the outlet is configured along a chord line of the buffer space.

17. The regulator of claim 13, wherein the seat member includes a plurality of outlets configured for enabling the fluid to be exhausted through each of the plurality of outlets in the same direction.

18. The regulator of claim 13, further comprising:

a diaphragm contacting an end of the seat member when the pressing member presses the cutoff member, the diaphragm being disposed between the pressing member and the seat member.

19. The regulator of claim 13, wherein the buffer space has a circular transverse section.

20. The regulator of claim 13, wherein a flow path in the outlet is configured to flow the fluid at one angle with respect to a radial direction of the buffer space.

21. A gas supply method using a regulator, comprising:

pressing a cutoff member disposed in a seat member to open an inlet of the seat member;

flowing a gas through the inlet into the seat member;

flowing the gas in one direction along an outer peripheral sidewall of the seat member into a buffer space through an outlet of the seat member; and supplying the gas to a process chamber through an outflow line connected to the buffer space.

22. The gas supply method of claim 21, wherein the seat member includes a plurality of outlets configured for exhausting the gas through each of the plurality of outlets in the same direction.

* * * * *